Dec. 28, 1926.

R. FISCHBACH

STOP VALVE

Original Filed Sept. 3, 1921

1,612,273

Inventor:
R. Fischbach
By Marks & Clerk
Attys.

Patented Dec. 28, 1926.

1,612,273

UNITED STATES PATENT OFFICE.

RICHARD FISCHBACH, OF BERLIN, GERMANY.

STOP VALVE.

Original application filed September 3, 1921, Serial No. 498,516, and in Germany February 19, 1921. Divided and this application filed February 1, 1924. Serial No. 690,032.

This application is a division of my application Serial No. 498,516, filed September 3, 1921.

This invention relates to stop valves of the sliding gate type, wherein the jointing plates or discs composing the gate or shutter are moved between the parallel jointing surfaces or seatings on the valve body by means of the valve spindle, without touching the seatings during the opening and closing movement of the valve.

The invention relates more particularly to the stop valves described in my corresponding patent application, Serial No. 498,516, in which the valve gate or shutter consists of two non-circular discs which are prevented by the valve casing from rotating, the said discs being moved into and out of contact with their seatings by means of a screw gear comprising two screw spindles which are rotated during the commencement of the opening movement and at the end of the closing movement of the valve spindle.

According to my application above referred to, the two screw spindles are connected together by means of a bolt, a ball bearing being interposed between the opposing ends of the said spindles. Actual trials have proved that the bearing balls may easily be subjected to an excessive specific pressure when the valve discs are forcibly pressed against their seatings.

The present invention has for its object to avoid this drawback and with this object in view, the ball bearing is replaced by a roller bearing having conical bearing rollers, the apices of the conical surfaces of which coincide with the common centre of the roller races. Through this arrangement the friction is purely a rolling friction and the pressure between the contacting surfaces is kept within admissible limits.

Figure 1:
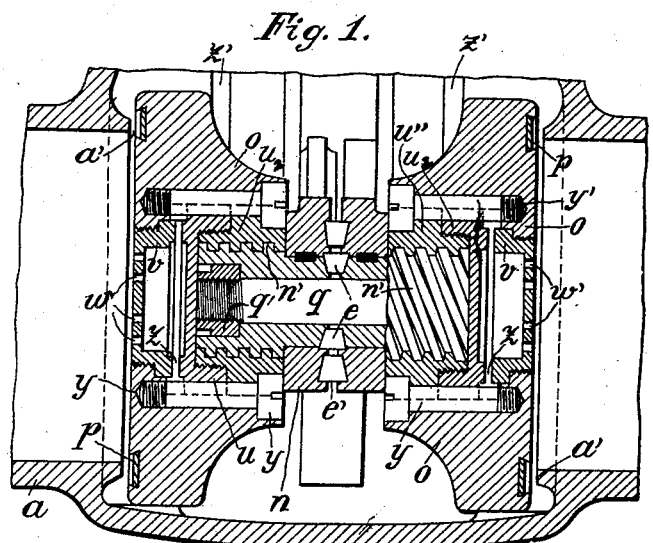
Figure 2:
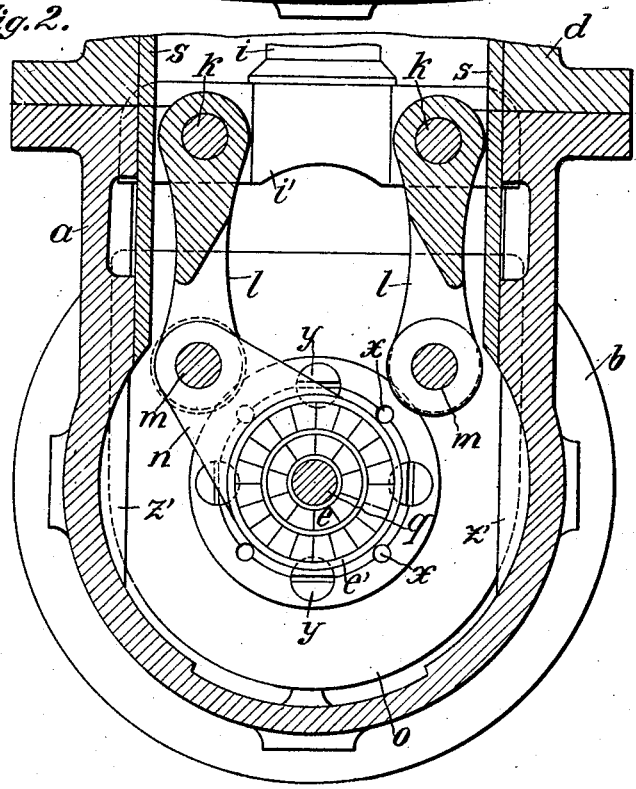

The invention is illustrated by way of example in the accompanying drawings in which Fig. 1 is a part vertical section and Fig. 2 is a cross-sectional view of the improved valve.

The valve casing $a$ is provided at each end with a flange $b$, only one of which is shown in Fig. 2. Within the interior of the valve casing are the usual jointing faces or seatings $a'$. The valve spindle (not shown) is screw-threaded and is enclosed by an internally threaded sleeve $i$, only the lower end of which is shown in Fig. 2, the said sleeve being raised or lowered by the rotation of the valve spindle. The lower end of the sleeve $i$ merges into a cross beam $i'$ provided with two bolts $k$. Pivoted on the bolts $k$ are the upper ends of the two links $l$ the lower ends of which are pivoted on bolts $m$ provided on two crank arms $n$. A loose collar or roller $r$ is arranged on each of the bolts $m$ in order to keep the two links at the required distance apart from each other, and to provide suitable guiding means. The cranks $n$, only one of which is shown, are rigidly connected to two threaded spindles $n'$ the threads on which have the same hand. The two spindles $n'$ are connected together by means of a screw bolt $q$ and a nut $q'$, a plurality of conical bearing rollers $e$ being interposed between the opposing ends of the spindles $n'$, the apices of the conical surfaces of the rollers coinciding with the common centre of the roller races. As shown in Fig. 1, the conical bearing rollers are arranged in two concentric rows, the apices of the conical surfaces of both rows meeting at the common centres of the concentric roller races. The screw threads of the two spindles engage internal screw threads formed in bushes $u_2$, one of which is arranged at the outer end of each spindle. Each of the non-circular valve discs $o$ is provided with an axial bore within which one of the bushes $u_2$ is arranged to slide, but is prevented from rotating therein relatively to the valve disc. Packing rings $p$ are fitted into the valves discs near the edges thereof, the said packing rings being adapted to bear against the seatings $a'$ when the valve is closed. A cap $u$ is screwed onto the outer end of each of the bushes $u_2$ and encloses the threaded portion of the spindle $n'$, the said cap acting as the valve disc of a relief valve in a manner which will hereinafter be described. The movement of the bushes $u_2$ in the bores of the valve discs is limited at one end by means of screws $y$, the shanks of which are perfectly smooth except for the threaded portion $y'$ which is screwed into the valve disc. The axes of the screws $y$ are situated within the bore formed in the valve disc in proximity to the wall of the said bore, so that the greater portion of the screws will extend within the bore. The bushes $u_2$ together with the screwed caps are provided with longitudinal grooves for receiving the portions of the shanks of the screws $y$ which extend within the bores of the valve discs. This prevents the screws $y$ from unscrewing themselves as would be the case if they were so positioned that exactly one half of the shank were within the bore and one half within the body of the valve disc. The seatings on the caps $u$ co-act with corresponding seatings provided on plugs $v$ which close the outer ends of the bores in the valve discs $o$ and which are provided with apertures $w$. Between each pair of screws $y$ apertures $x$ are provided which establish communication between the gap $z$ shown in Fig. 1, and the valve chamber.

The valve operates in the following manner: Assuming that the valve discs have been lowered into the position shown in Fig. 1, until they rest on the stops $c$, the seatings $p$ will be co-axial with the seatings $a'$ but the fluid will still flow from the pressure side round the one valve disc, as well as through the passages $w$ in the plug $v$ of the said disc, gap $z$ and the axial apertures $x$ into the valve chamber, and subsequently in the reverse order, round the other valve disc and through the axial apertures $x$ therein, the gap $z$ and apertures $w$ to the no-pressure side of the valve. If the spindles $n'$ be now turned by means of the cranks $n$, they will screw out of the internal threads in the bushes $u_2$ thereby displacing the bushes, together with the caps $u$ thereon, in an axial direction until the seatings on the caps $u$ rest on the seatings $v$ thereby closing the relieving valves. The main valve discs $o$ will now also be moved until the seatings $p$ are pressed on to the seatings $a'$. In this manner the sliding stop valve is closed and the pressure side is effectually isolated from the no-pressure side. If the valve is to be opened, that is if the no-pressure side is to be put under pressure the spindles $n'$ are screwed into the bushes $u_2$ by rotating the cranks $n$ in the opposite direction and the two valve discs $o$ will be free to approach one another. The fluid on the pressure side of the valve will thereupon force the respective valve disc $o$ off its seating $a'$ and flow into the valve chamber, pressing against the inside of the valve disc on the no-pressure side, thus preventing a gap forming on the no-pressure side, and keeping the valve disc in contact with its seating. On the spindles $n'$ being rotated further the valve disc on the pressure side will be caused to rest against the guiding rail $z'$. On the spindles being turned still further, the valve disc on the pressure side not being able to continue its axial movement owing to its resting against the rail $z'$, the valve seating on the disc $u$ will be brought out of contact with the seating on the plug $v$ on the pressure side of the valve. The relief valve of the valve disc on the no-pressure side will already have been opened because the force pressing on it is only a fraction of the pressure acting on the main valve disc $o$, and the fluid under pressure flowing gradually from the valve chamber through the apertures $x$, through the relief valve and apertures $w$ in the no-pressure valve disc into the no-pressure pipe line will establish equilibrium of pressure on both sides of the valve. By this means it is possible to lift the two valve discs into the upper portion of the valve chamber without requiring any particular exertion.

The total cross sectional area of the apertures $x$ as well as of the apertures $w$ is kept materially smaller than that of the annular gaps $z$ for instance half the size of the latter. In this manner the well ground seating faces of the relief valves are not so quickly worn out and injured by the passing fluid, owing to the lower velocity of the latter in flowing through the gaps. The diameter of each of the apertures $w$ is rather small, consequently the web of the seating member $v$ containing the apertures $w$ will protect the seating faces of the relief valve against dirt and other injurious matter in the manner of a strainer.

What I claim is:—

1. A stop valve of the sliding gate or shutter type comprising in combination a valve casing, inlet and outlet ports, a valve seat at each of the said ports inside the valve casing, a shutter consisting of two non-circular discs intended to close said ports and shaped so as to be prevented by the valve casing from rotating, a screw gear including two screw spindles for moving the valve discs into and out of contact with the valve seats and a roller bearing having conical bearing rollers interposed between opposing ends of said screw spindles, the apices of the conical surfaces of said rollers being arranged to coincide with the common centre of the roller races, as set forth.

2. A stop valve of the sliding gate or shutter type comprising in combination a valve casing, inlet and outlet ports, a valve seat at each of the said ports inside the valve casing, a shutter consisting of two non-circular discs intended to close said ports and shaped so as to be prevented by the valve casing from rotating, a screw gear including two screw spindles for moving the valve discs into and out of contact with the valve seats and a plurality of concentric roller bearings having conical bearing rollers interposed between opposing ends of said screw spindles, the apices of the conical surfaces of said rollers being arranged to coincide with the common centres of the concentric roller races, as set forth.

3. A stop valve of the sliding gate or shutter type, comprising the combination with a valve casing having inlet and outlet ports, a main valve seating at each of said ports inside the valve casing, a shutter comprising two non-circular discs for closing said ports, said discs being adapted to co-operate with the valve casing for preventing rotation of the discs, a screw gear comprising two spindles for moving said non-circular discs into and out of close contact with the said main valve seatings, apertures provided in the non-circular discs for enabling pressure fluid to pass through the discs from one side thereof to the other, relief valves capable of obstructing the passage of pressure fluid through said apertures and seatings for said relief valves, of means for connecting said relief valves to the said two spindles of the screw-gear for enabling said spindles to withdraw said relief valves from their seatings prior to moving the non-circular discs out of contact with the main valve seatings and to press them on to their seatings prior to moving the non-circular discs into contact with the main valve seatings, as set forth.

4. A stop valve of the sliding gate or shutter type, comprising the combination with a valve casing having inlet and outlet ports, a main valve seating at each of said ports inside the valve casing, a shutter comprising two non-circular discs for closing said ports, said discs being adapted to co-operate with the valve casing for preventing rotation of the disks, a screw gear comprising two spindles for moving said non-circular discs into and out of close contact with the said main valve seatings, apertures provided in the non-circular discs for enabling pressure fluid to pass through the discs from one side thereof to the other, axial cavities provided in said non-circular discs, relief valves capable of obstructing the passage of pressure fluid through said apertures and seatings for said relief valves, of means for connecting said relief valves to the said two spindles of the screw gear for enabling said spindles to withdraw said relief valves from their seatings prior to moving the non-circular discs out of contact with the main valve seatings and to press them on to their seatings prior to moving the non-circular discs into contact with the main valve seatings, said means comprising bushes fixed to the relief valves and having internal screw threads adapted to engage said spindles, said bushes being inserted in said axial cavities and capable of sliding therein.

5. A stop valve of the sliding gate or shutter type, comprising the combination with a valve casing having inlet and outlet ports, a main valve seating at each of said ports inside the valve casing, a shutter comprising two non-circular discs for closing said ports, said discs being adapted to co-operate with the valve casing for preventing rotation of the discs, a screw gear comprising two spindles for moving said non-circular discs into and out of close contact with the said main valve seatings, apertures provided in the non-circular discs for enabling pressure fluid to pass through the discs from one side thereof to the other, axial cavities provided in said non-circular discs, relief valves capable of obstructing the passage of pressure fluid through said apertures and seatings for said relief valves, of means for connecting said relief valves to the said two spindles of the screw gear for enabling said spindles to withdraw said relief valves from their seatings prior to moving the non-circular discs out of contact with the main valve seatings and to press them on to their seatings prior to moving the non-circular discs into contact with the main valve seatings, said means comprising bushes fixed to the relief valves and having internal screw threads adapted to engage said spindles, said bushes being inserted in said axial cavities and capable of sliding therein, and abutments provided on the non-circular discs for limiting the movement of the bushes away from the relief valve seatings.

6. A stop valve of the sliding gate or shutter type as set forth in claim 4, having the relief valves comprising caps which completely close the ends of the bushes, for the purpose set forth.

7. A stop valve of the sliding gate or shutter type, comprising the combination with a valve casing having inlet and outlet ports, a main valve seating at each of said ports inside the valve casing, a shutter comprising two non-circular discs for closing said ports, said discs being adapted to co-operate with the valve casing for preventing rotation of the discs, a screw gear comprising two spindles for moving said non-circular discs into and out of close contact with the said main valve seatings, apertures provided in the non-circular discs for enabling pressure fluid to pass through the discs from one side thereof to the other, axial bores provided in said non-circular discs, cylindrical bushes inserted in said axial bores and having internal screw threads adapted to engage said spindles, said bushes being capable of moving axially within said bores, means for preventing said bushes from rotating, relief valves fixed to said bushes and capable of obstructing the passage of pressure fluid through the apertures in the non-circular discs and seatings for said relief valves.

8. A stop valve of the sliding gate or shutter type, comprising the combination with a valve casing having inlet and outlet ports, a main valve seating at each of said ports inside the valve casing, a shutter comprising two non-circular discs for closing said ports, said discs being adapted to co-operate with the valve casing for preventing rotation of the discs, a screw gear comprising two spindles for moving said non-circular discs into and out of close contact with the said main valve seatings, apertures provided in the non-circular discs for enabling pressure fluid to pass through the discs from one side thereof to the other, axial bores provided in said non-circular discs, cylindrical bushes inserted in said axial bores and having internal screw threads adapted to engage said spindles, said bushes being capable of moving axially within said bores, axial grooves provided on the peripheries of the bushes, bolts screwed axially into the non-circular discs, said bolts being adapted to act as feather keys for preventing rotation of the bushes, relief valves fixed to said bushes and capable of obstructing the passage of pressure fluid through the apertures in the non-circular discs and seatings for said relief valves.

9. A stop valve of the sliding gate or shutter type, comprising in combination a valve casing having inlet and outlet ports, a main valve seating at each of said ports inside the valve casing, a shutter comprising two circular discs for closing said ports, said discs being adapted to co-operate with the valve casing for preventing rotation of the discs, axial cavities provided in said non-circular discs, a screw gear comprising two spindles for moving said non-circular discs into and out of close contact with the said main valve seatings, plugs screwed into the non-circular discs for closing ends of the axial cavities, said plugs being provided inside the cavities with valve seatings, apertures provided in said plugs for admitting pressure fluid into the cavities, axial passages provided in the non-circular discs for admitting pressure fluid from the cavities to the inside of the valve casing, bushes inserted in said cavities and having internal screw threads adapted to engage said spindles, said bushes being capable of moving axially within said cavities, relief valves fixed to said bushes and capable of co-operating with the valve seatings provided on the said plugs for preventing the passage of fluid through said axial passages.

10. A stop valve of the sliding gate or shutter type, comprising in combination a valve casing having inlet and outlet ports, a main valve seating at each of said ports inside the valve casing, a shutter comprising two circular discs for closing said ports, said discs being adapted to co-operate with the valve casing for preventing rotation of the discs, axial cavities provided in said non-circular discs, a screw gear comprising two spindles for moving said non-circular discs into and out of close contact with the said main valve seatings, plugs screwed into the non-circular discs for closing ends of the axial cavities, said plugs being provided inside the cavities with valve seatings, apertures provided in said plugs for admitting pressure fluid into the cavities, axial passages provided in the non-circular discs for admitting pressure fluid from the cavities to the inside of the valve casing, bushes inserted in said cavities and having internal screw threads adapted to engage said spindles, relief valves fixed to said bushes and capable of co-operating with the valve seatings provided on the said plugs for preventing the passage of fluid through said axial passages, said bushes being capable of moving axially within said cavities for a distance such that the circumferential area of the spaces between the relief valves and their seatings when full open is greater than the combined cross-sectional areas of the apertures provided in the plugs and the combined cross-sectional areas of the axial passages provided in the non-circular discs, for the purpose of reducing the velocity of the pressure fluid passing between the relief valves and their seatings.

In testimony whereof I have signed my name to this specification.

RICHARD FISCHBACH.